United States Patent [19]

Harris, Jr.

[11] Patent Number: 4,864,786
[45] Date of Patent: Sep. 12, 1989

[54] TOLERANCE COMPENSATING CLIP

[75] Inventor: Charles F. Harris, Jr., Ypsilanti, Mich.

[73] Assignee: Ford Motor Company, Dearborn, Mich.

[21] Appl. No.: 138,104

[22] Filed: Dec. 28, 1987

[51] Int. Cl.⁴ .................................................. E06B 1/04
[52] U.S. Cl. ...................................... 52/214; 52/717.1
[58] Field of Search ................ 52/397, 717, 400, 208, 52/214; 296/93, 201

[56] References Cited

U.S. PATENT DOCUMENTS

| | | | |
|---|---|---|---|
| 3,851,433 | 12/1974 | Colucci | 52/401 |
| 4,135,277 | 1/1979 | Taviai et al. | 24/73 PC |
| 4,147,005 | 4/1979 | Meyer | 52/397 |
| 4,170,855 | 10/1979 | Murray et al. | 52/717 X |
| 4,262,960 | 4/1981 | Fifer | 296/93 X |
| 4,379,379 | 4/1983 | Sengoku | 52/397 X |
| 4,393,560 | 7/1983 | Kato | 52/717 X |
| 4,412,406 | 11/1983 | Sengoku | 52/397 X |
| 4,700,525 | 10/1987 | Niebuer et al. | 52/397 |

FOREIGN PATENT DOCUMENTS 2352975 5/1977 France ................ 52/397

Primary Examiner—Carl D. Friedman
Attorney, Agent, or Firm—Daniel M. Stock; Clifford L. Sadler

[57] ABSTRACT

A positioning system for securing a pane of glass to be adhesively attached to an automotive vehicle body is provided which employs a modified molding carrier for the glass pane which includes a rib for engaging positioning devices carried in a body flange surrounding the glass pane and embodiments of the system are disclosed in which the modified molding carrier cooperates with tufted strips and positively locking positioning clips.

7 Claims, 3 Drawing Sheets

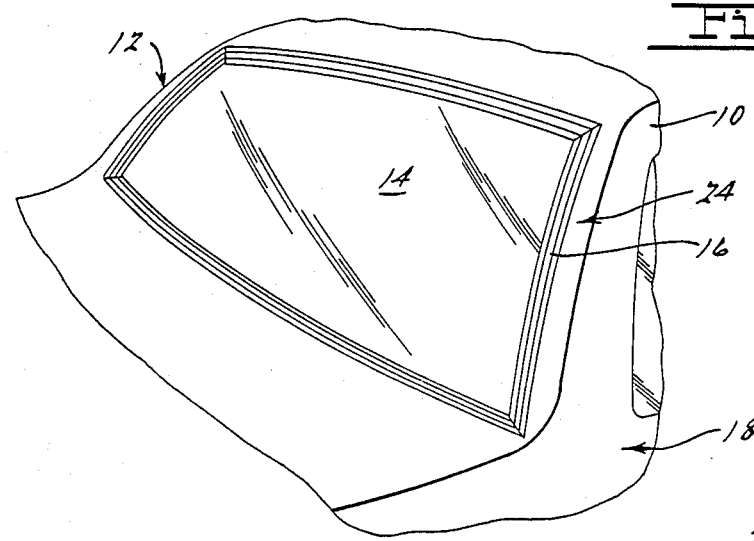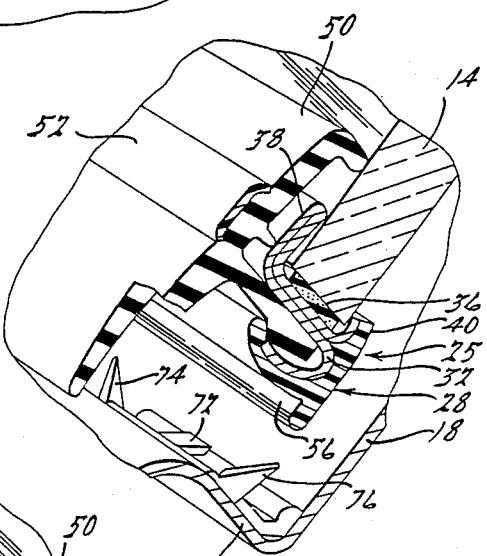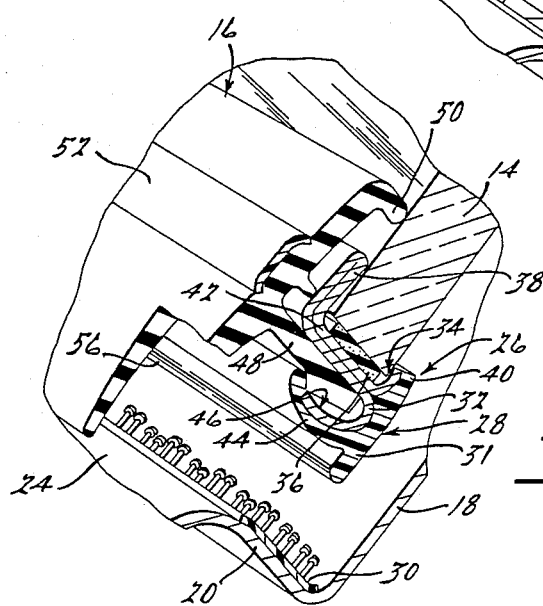

TOLERANCE COMPENSATING CLIP

BACKGROUND OF THE INVENTION

The present invention relates generally to devices for positioning non-movable glass panes in automotive vehicle bodies. The invention relates more specifically for positioning members for such glass panes which are at least in part surrounded by a molding having a stiff carrier portion for engaging the glass and a more pliable overlying decorative portion for covering the interface between the glass pane and the vehicle body.

DESCRIPTION OF THE PRIOR ART

In assembling glass panes into flanges formed around apertures in vehicle bodies, a signficant manufacturing problem lies in the compensation for variations in clearances between the associated parts. In the assembly of modern motor vehicle bodies, the primary means of fixing glass panes to the body is through the application of an adhesive in rabbet flanges formed about the window apertures. While such adhesives are effective in retaining the glass to the body, they generally require a significant amount of time to cure and attain sufficient strength to retain the glass effectively. Since the adhesive is applied during the assembly process of the vehicle and the vehicle body is moving along an assembly line, attention has necessarily been given to maintaining the position of the glass through means other than the primary adhesive during that curing time. A common approach in solving this problem is that exemplified in U.S. Pat. No. 3,851,433 to Colucci which provides for a metallic clip forming a channel for receiving the edge of a pane of glass, the clip being fixedly secured by appropriate mechanical fastening means to the vehicle body and a decorative molding being attached to the clip along the interface between the glass pane and the body. Positioning systems of this type suffer certain disadvantages, however. They require direct contact between the positioning fastener and the glass which is not desirable for glass systems in which a modularized construction is used in assembling retaining and decorative molding to the glass prior to installation in the vehicle. They also are disadvantageously limited in their ability to compensate for peripheral clearance tolerances between the glass panel and the body. U.S. Pat. No. 4,135,277 to Taniai et al and U.S. Pat. No. 4,147,005 to Meyer disclose other such positioning devices for directly engaging and positioning glass panes.

SUMMARY OF THE INVENTION

Responsive to the deficiencies in the prior art, it is object of the present invention to provide an improved positioning clip for the accurate tolerance compensating positioning of a glass pane in the aperture of an automotive vehicle body during the setting of an adhesive at assembly.

According to one feature of the present invention, an improved construction is provided for modular framing devices for automobile windows of the type which include a stiff plastic carrier portion including means for carrying the window, the improvement lying in the provision of a rib portion extending substantially parallel to a major flat surface of the window and cooperating with retaining devices positioned at least along portions of top and bottom flanges surrounding the window aperture.

According to another feature of the invention, the positioning devices carried along the body flange adjacent at least the top of the window are specially configured clips which receive and retain the rib in snap-fit relationship over a relatively wide range of peripheral clearances between glass pane and body.

BRIEF DESCRIPTION OF THE DRAWINGS

These and other features will become apparent to those skilled in the automotive assembly arts upon reading the following description with reference to the accompanying drawings in which:

FIG. 1 is a partial rear perspective view of an automobile showing its rear window;

FIG. 2 is an enlarged perspective view partially in cross-section taken along lines II—II of FIG. 1 illustrating in an exploded fashion the assembly of the window of FIG. 1 using the positioning clip of the present invention;

FIG. 3 is an exploded perspective view similar to FIG. 2 showing in cross section taken along lines III—III of FIG. 1 the installation of the window of FIG. 1 against another positioning device;

DESCRIPTION OF THE PREFERRED EMBODIMENTS

Figure 4:
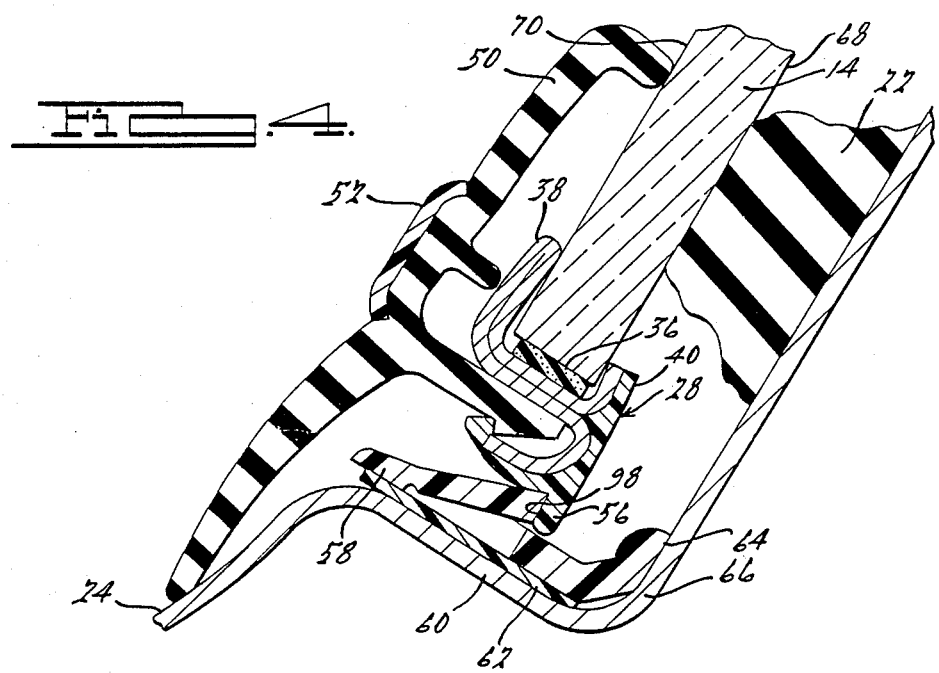
FIG. 4 is an enlarged partial cross-sectional view showing the assembled position of the window with respect to the positioning clip of FIG. 2.

Turning now to the drawings, an automotive vehicle 10 is illustrated as including a rear window 12 which comprises a glass pane 14 surrounded by a molding assembly 16. In the embodiment illustrated in the drawings, the vehicle 10 includes a body 18 formed as a metal stamping including a rabbet flange 20 formed about the periphery of the body aperture for the window 12. It will be appreciated by those skilled in the automotive body arts that other materials, such as plastics, may be chosen for formation of the body 18 and manufacturing processes other than metal stamping might likewise be used without losing the positioning benefit of the system of the present invention.

Figure 5:
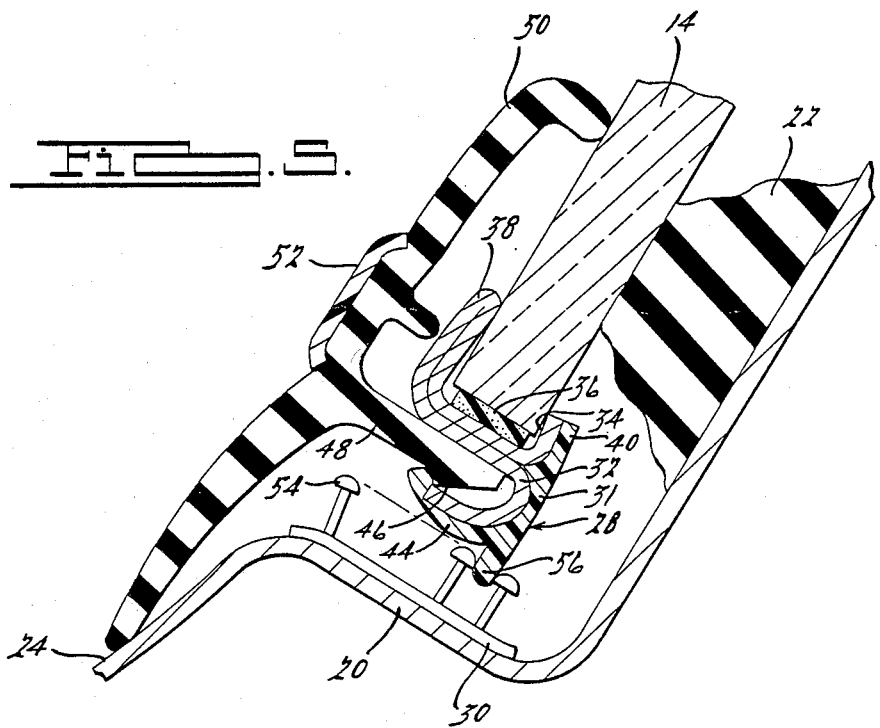
FIG. 5 is an enlarged cross-sectional view showing the assembled position of the window with respect to the positioning device of FIG. 3.

The glass pane 14 is secured to the rabbet flange 20 of the vehicle body 18 through application of an adhesive 22, as may best be seen in FIGS. 4 and 5. To accurately position the glass pane 14 with respect to outer surfaces of the vehicle body 18, such as indicated at 24, the positioning devices shown in FIG. 2 and FIG. 3 are utilized. It is to be understood that while the positioning devices of FIGS. 2 and 3 are illustrated as being positioned at the rabbet flange 20 extending across the bottom surface of the window 12, replications of either or both of the positioning devices of FIGS. 2 and 3 may be utilized at other peripheral edges. The use of such positioning devices at at least the top of the window 12, together with those placed at the bottom, is desirable for accurate positioning. The positioning devices of either or both types may also be used on the sides of the window 12. In the environment of an automotive assembly plant, it has been found particularly effective to utilize positioning devices of the type shown in FIG. 3 at the bottom of the window 12 and positioning devices of the type shown in FIG. 2 at the top and in some assemblies, at the top and sides.

Turning now to FIGS. 2-5, a window positioning system arranged on a vehicle according to the present invention and utilizing its components is shown in more detail. FIGS. 3 and 5 illustrate one positioning assembly in position just prior to assembly of the window 12 into the vehicle 10 and after that assembly, respectively. A positioning assembly 26 is illustrated as comprising an improved molding assembly 28 and a tufted locking strip 30. The improved molding 28 constitutes a modification of a two-piece molding assembly commercially available in the automotive industry. It consists essentially of a hard plastic carrier 31 which may be coextruded with a metallic stiffener 32 to form a channel 34 for accepting the glass pane 14. An adhesive layer 36 deposited in the channel 34 secures the carrier 31 to the glass pane 14 in a manufacturing process accomplished remote from the assembly line for the vehicle 10. The channel 34 is bounded by side walls 38, 40 for engaging the glass pane 14 and by a wall 42 on which the adhesive 36 is deposited. Spaced from the wall 42 is a lip 44 projecting from an extrusion of the wall 40 in cantilever fashion to define a gripping recess 46 into which is lockingly inserted a rib 48 of a soft plastic decorative molding 50. The decorative molding 50 extends between the glass pane 14 and outer surface 24 of the body 18 and may itself be coextruded with a metallic strip such as indicated at 52 to present a pleasing exterior appearance.

The tufted strip 30 is of known design fabricated from plastic and suitably secured to the rabbet flange 20. Flexible knobbed projections 54 on the strip 30 cooperate with juxtaposed surfaces of the molding 30 to resist outward movement of the glass pane 14 after assembly to the position of FIG. 5. In moldings of the type utilized prior to the present invention, the cooperating molding surfaces consisted of projections from the leg 44 positioned distal its inner side wall. In the improved construction of the present invention, an extended locking rib 56 of the wall 32 on the inner side of the glass pane 14 provides a stiff locking member which is adaptable for use both with the known locking strips 30 and with the new positioning device illustrated in FIGS. 2 and 4.

The positioning assembly 25 of the FIG. 2 embodiment, therefore, makes use of an identical molding assembly 28 with a new positioning clip 58 which more positively and accurately restrains and limits outward movement of the glass pane 14 with respect to the body 18 than the tufted strip 30 of the FIG. 3 embodiment. The clip 58 also provides for peripheral tolerance compensation. The clip 58 is formed as a unitary molded plastic part that is adhesively secured to a wall 60 of the rabbet flange 20 in a suitable manner such as through the application of a pressure sensitive adhesive tape indicated at 62. The clip 58 includes a foot 64 for engaging a wall 66 of the body 18 which is illustrated as being essentially parallel to the major planar surfaces 68, 70 of the glass pane 14. It also comprises a central locking tab 72 and a pair of flexible locking wings 74, 76.

Figure 6:
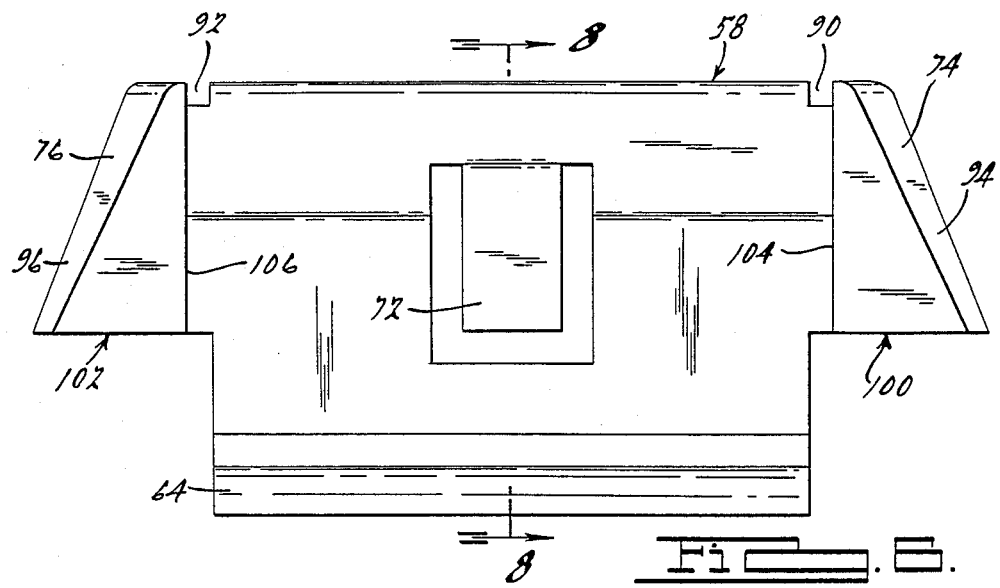
FIG. 6 is a front view of the positioning device of FIG. 4.
Figure 7:
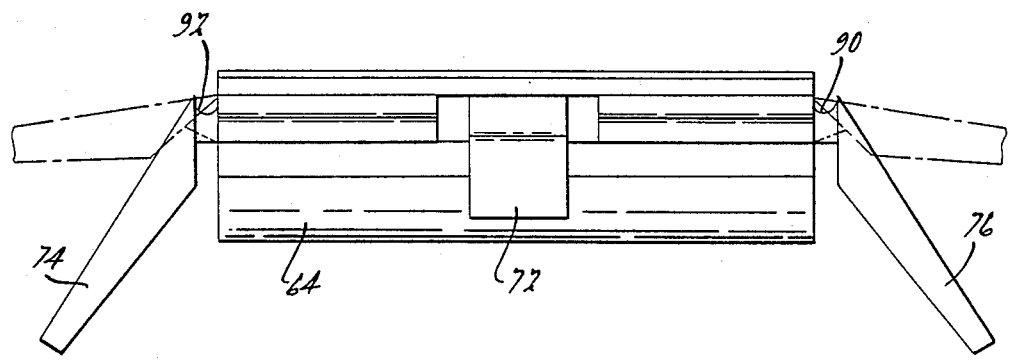
FIG. 7 is a top view of the positioning device of FIG. 6.
Figure 8:
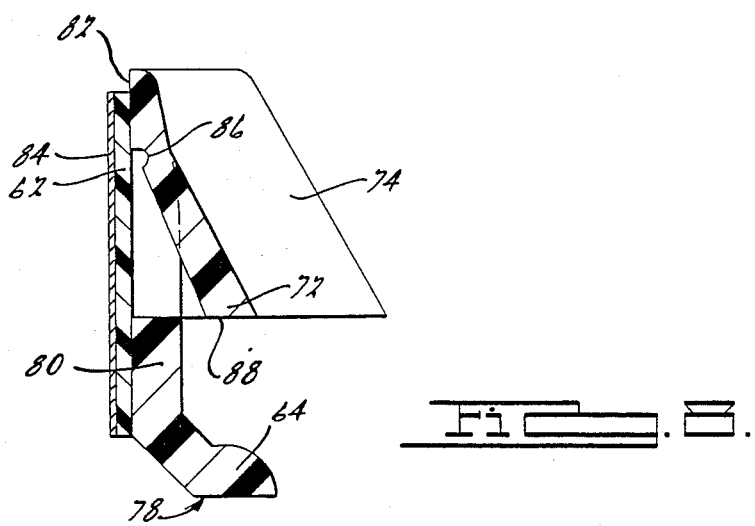
FIG. 8 is a cross-sectional view taken along lines VIII—VIII of FIG. 6.

FIGS. 6-8 illustrate the construction of the new clip 58 in more detail. The foot portion of 64 includes a flat mounting surface 78 for abutting a corresponding surface on wall 66 of the vehicle body 18. A flat base portion 80 extends perpendicularly to the mounting surface 78 and includes a flat outer surface 82 to which the tape 62 may be applied. For convenient assembly, a tape utilizing a release paper 84 may be employed. Extending outwardly from the base portion 80 proximate its center is the canted central locking tab 72 which has a cross-sectional reduction to form a hinge point 86 where it extends from the base portion 80 and which includes a flat bottom surface 88 at its free end. Flanking the central locking tab are the locking wings 74, 76. They are connected to the base portion 80 to permit pivotal movement, as may best be seen in FIG. 7, through the formation of hinge points 90, 92, respectively. The swingable movement of the wings 74, 76 of the clip 58 provides for the accommodation of a relatively wide range (approximately 8mm) in peripheral clearance tolerances between opposed surfaces (top to bottom or side to side) of the aperture and the window 12. In assembling the window 12 into the automobile body 18 from the position shown in FIG. 2 to that shown in FIG. 4, the locking rib 56 of the molding assembly 28 engages canted outer surfaces 94, 96 of the wings 74, 76 to urge them to pivot outwardly from the solid line position of FIG. 7 to the dotted line position.

It has been found advantageous in some automotive assembly applications to use a positioning system that utilizes both the positioning assembly 25 of FIG. 2 and the positioning assembly 26 of FIG. 3 to efficiently and economically provide for holding of the window 12 during passage of the automobile 10 down the assembly line. In this assembly process, the window 12 is provided with the two-piece molding 28 installed and secured around its periphery. The layer of adhesive 22 is applied to a portion of the rabbit flange 20 extending peripherally around the window 12. The window 12 is then brought into contact with the adhesive layer 22 and its inward movement with respect to the vehicle body 18 is resisted in part by that adhesive layer 22. The weight of the window 12 urges it downwardly into a position below that shown in FIG. 5 in which the rib 56 of the molding 30 is engaged between rows of tufts 54 of the locking strip 30. Clips 58 are positioned in the rabbet flange 20 at the top edge of the window 12 and movement of this top edge toward the adhesive layer 22 results in the locking rib 56 of the molding assembly 28 engaging the canted surfaces 94, 96 of the wings 74 and 76 to swing them outwardly and allow passage of the locking rib 56. When the outer surface 98 of the rib 56 passes below the flat surface 88 of the central locking tab 72 and coplanar corresponding flat lower surfaces 100, 102 of the wings 74, 76, the wing 74, 76 flex outwardly and return inwardly due to their flexible plastic construction and assist in restraining outward movement of the window 12 with respect to the body 18. The central locking tabs 72 likewise flexes inwardly and snaps out to retain the locking rib 56, but provision of this locking surface alone would not provide the wide range of tolerance accommodation afforded by the present clip 58. The inwardly tapered canted wings 72, 74, as can best be seen in FIG. 7, extend substantially inwardly beyond the innermost extent of the locking tab 72 to accommodate a wider range of peripheral spacing tolerances. It will be appreciated that their generally triangular construction provides bending connections 104, 106 adjacent their hinge points 90, 92 that yield the resistance to outward movement of the window 12 not readily attainable in the construction of the locking tab 72 in which the tab 72 is cantilevered about its lateral axis.

Other combinations in the use and positioning of the clip 58 and the associated components here disclosed, such as the tufted strip 30 and the improved molding assembly 28, may be possible without departing from the scope of the appended claims.

I claim:

1. A positioning device for securing a window assembly of the type having a peripherally extending molding assembly including a stiff carrier member having formed therein a channel for receiving the peripheral edge of a glass pane, the glass pane being adapted to be adhesively attached to an automotive vehicle body, during hardening of the adhesive, the body having an aperture formed therethrough for receiving the window assembly and a flange portion surrounding the aperture, and the clip comprising:

a base portion adapted to be mounted on the flange portion of the body adjacent an edge of the glass pane;

a locking tab portion positioned proximate the center of the base portion and projecting perpendicularly toward the window assembly to be lockingly engageable in snap-fit relationship with portions of the molding assembly; and a pair of locking wing portions each mounted for reciprocal pivotal movement on the base portion and spaced on either side of the locking tab and extending toward the window assembly and lockingly engageable with portions of the molding assembly.

2. A positioning device as defined in claim 1 wherein the molding assembly portions comprise a rib projecting from the channel toward the clip.

3. A positioning device as defined in claim 2 wherein the wing portions are triangularly shaped and have a flat locking surface for lockingly engaging the one side of the rib and a canted surface engageable with the other side of the rib for effecting pivotal movement of the wing portions during assembly of the window into the body.

4. A positioning device for securing a window assembly adapted to be adhesively attached to an automotive vehicle body, during hardening of the adhesive, the body having an aperture formed therethrough for receiving the window assembly and a flange portion surrounding the aperture, and the clip comprising:

a base portion adapted to be mounted on the flange portion of the body parallel to and adjacent an edge of the window assembly;

a locking tab portion positioned proximate the center of the base portion and projecting toward the window assembly to be lockingly engageable in snap-fit relationship with portions thereof; and a pair of locking wing portions each mounted for reciprocal pivotal movement on the base portion and spaced on either side of the locking tab and extending obliquely from the base portion to a position substantially closer to the window assembly than the locking tab portion.

5. A positioning clip as defined in claim 4 wherein the wing portions are triangularly shaped and have a flat locking surface for lockingly engaging the window assembly and a canted surface engageable with the window assembly for effecting pivotal movement of the wing portions during assembly of the window into the body.

6. A positioning device for securing a window assembly adapted to be adhesively attached to an automotive vehicle body, during hardening of the adhesive, the body having an aperture formed therethrough for receiving the window assembly and a flange portion surrounding the aperture, and the clip comprising:

a base portion adapted to be mounted on the flange portion of the body adjacent an edge of the window assembly;

first and second locking members engageable in snap-fit relationship to retain the window assembly against outward movement with respect to the body, the first locking member comprising a centrally located tab struck out from the base portion; and means pivotally mounted on the base portion for effecting the snap-fit retention and for compensating for substantial variation in peripheral clearances between the glass pane and adjacent portions of the body, the secondary locking member and the means for compensating being unitarily formed as a pair of wings pivotally mounted to the base portion for reciprocal movement with respect to the peripheral edges of the window assembly on either side of the centrally located locking tab portion, and wherein the wings extend obliquely from the base portion to a position substantially closer to the window assembly than the locking tab.

7. A positioning clip as defined in claim 6 wherein the wing portions are triangularly shaped and have a flat locking surface for lockingly engaging the window assembly and a canted surface engageable with the window assembly for effecting pivotal movement of the wing portions during assembly of the window into the body.

* * * * *